Sept. 30, 1941.    H. H. KLEMOLA    2,257,172
WINDING AND UNWINDING APPARATUS
Filed March 7, 1939
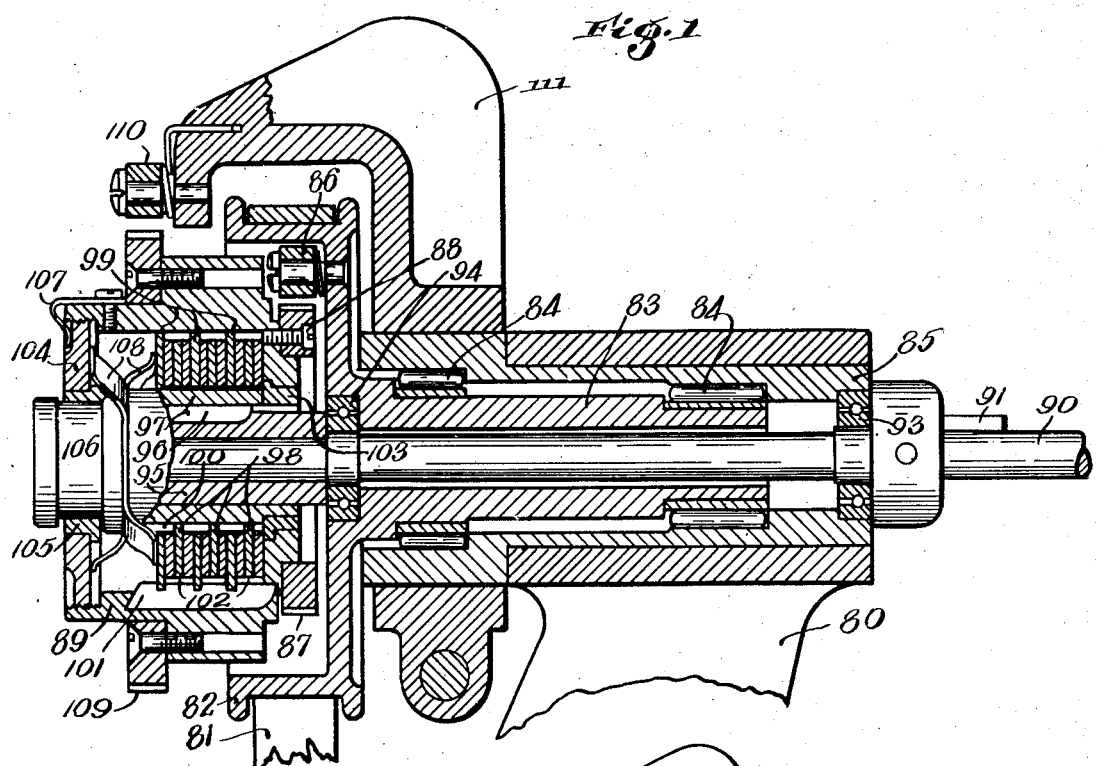
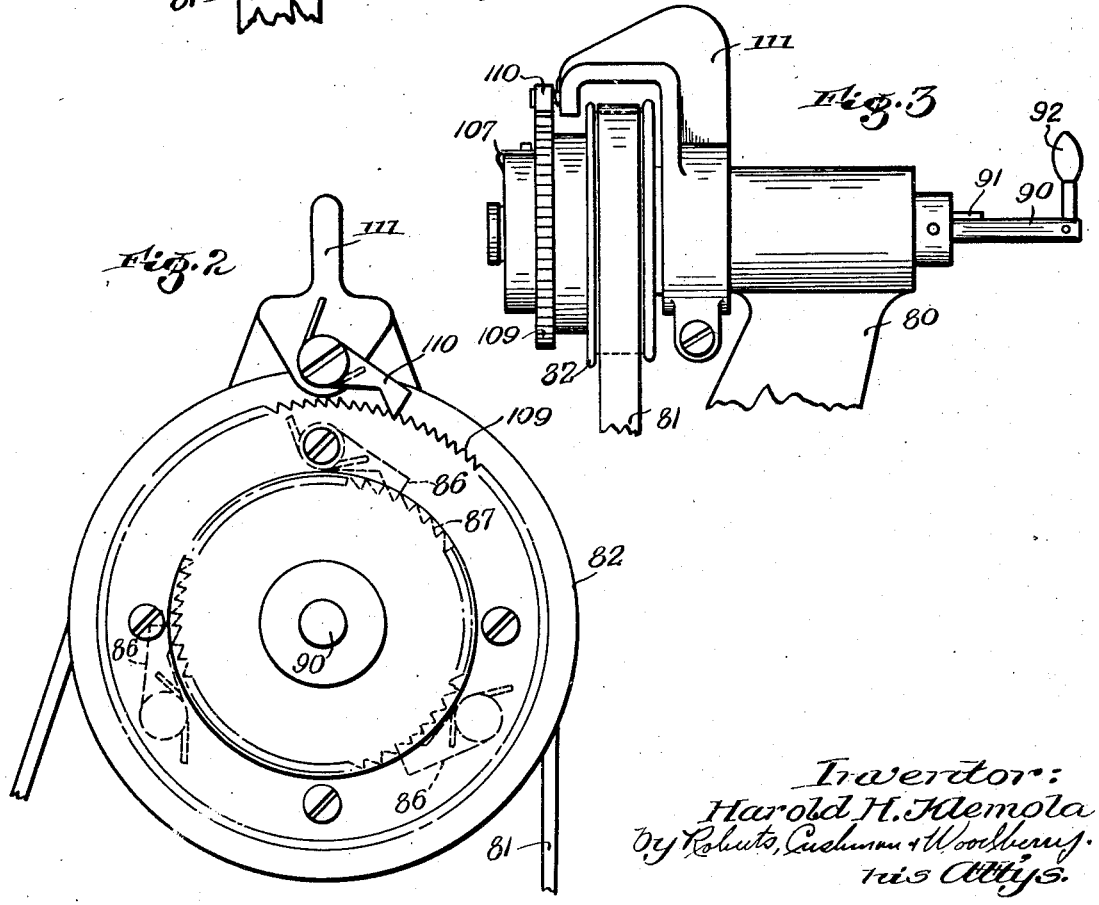
Inventor:
Harold H. Klemola
By Roberts, Cushman & Woodberry
his Attys.

Patented Sept. 30, 1941

2,257,172

UNITED STATES PATENT OFFICE 2,257,172

WINDING AND UNWINDING APPARATUS

Harold H. Klemola, North Hollywood, Calif., assignor to Technicolor Motion Picture Corporation, Los Angeles (Hollywood), Calif., a corporation of Maine Application March 7, 1939, Serial No. 260,322

1 Claim. (Cl. 242—55)

This invention relates to apparatus for winding and unwinding motion picture film and other articles of elongate and flexible nature, objects of the invention being to provide reversible mechanism which, when running in one direction, serves to wind the film or the like with uniform tension and, when operating in reverse direction, serves to retard unwinding with a uniform braking force, which requires no readjustment when the mechanism is reversed, which requires only one friction clutch for the aforesaid purposes, and generally to improve the art to which the invention relates.

For the purpose of illustration a typical embodiment of the invention is shown in the accompanying drawing in which—

Fig. 1 is an axial sectional view;

Fig. 2 is an end elevation; and

Fig. 3 is a side elevation on reduced scale.

The particular embodiment of the invention chosen for the purpose of illustration comprises a bracket 80 for mounting the mechanism and a belt 81 for driving the mechanism, as described more fully in abandoned application Serial No. 260,326, filed on even date herewith by Gerald F. Rackett and assigned to the same assignee as this application.

The belt 81 trains over a pulley 82 which is journaled in the bracket 80 through the medium of a hub 83, roller bearings 84 and a fixed sleeve 85. Mounted on the side of the pulley 82 are three spring-pressed pawls 86 which engage the teeth of a ratchet ring 87. The ring 87 is mounted by means of screws 88 on the outer cylindrical part 89 of a clutch assembly.

Coaxial with the pulley 82 is a film reel spindle 90 having a key 91 to prevent rotation of the reel on the spindle and having a detent 92 to hold the reel on the spindle. The spindle is journaled in ball bearings 93 and 94, bearing 93 being mounted in the stationary sleeve 85 and the bearing 94 being mounted in the pulley 82. Fast to the left-hand end of the spindle (Fig. 1) is a sleeve 95. Surrounding this sleeve and keyed thereto with a key 96 is another sleeve 97. Surrounding the sleeve 97 are two sets of clutch rings 98 and 99, rings 98 being keyed to the sleeve 97 by means of internal lugs projecting into the keyway 100 in the sleeve 97 and the rings 99 being keyed to the outside ring 89 by means of key 101. Loosely mounted between the rings 98 and 99 are friction rings 102. The right-hand end of the outside ring 89 (Fig. 1) is rotatably mounted through the medium of a bushing 103 and the left-hand end of the ring is rotatably supported on the spindle 90 through the medium of an end ring 104, a bushing 105 and a sleeve 106. The ring 104 is threaded into the ring 89 and is held in position by a spring 107 seating in one of a series of recesses in the outer face of the ring. Interposed between the ring 104 and the friction rings 98 and 99 is a spring 108 which presses the friction rings together, the right-hand end of the ring 89 counteracting the thrust of the spring 108. Thus the parts of the clutch which are keyed to the spindle 90 comprise 95, 96, 97 and 98 and the parts of the clutch assembly which rotate with the spindle 90 only through frictional engagement comprise 89, 99, 102 and 104. Fast to the outside of the ring 89 is a ratchet ring 109 engageable with a pawl 110 mounted on the stationary bracket 111.

The operation of the ratchet mechanism is as follows. When the reel on spindle 90 is functioning as a take-up reel the spindle 90 is driven in a clockwise direction (Fig. 2) through the medium of the belt 81, pulley 82, pawls 86, ratchet ring 87 and the clutch assembly, thereby tending to drive the reel at a somewhat greater rate than that of the film, the clutch slipping enough to maintain a constant pull on the film. During this clockwise rotation pawl 110 rides idly over the teeth of ring 109. When the belt 81 is driven in the opposite direction, pawls 86 are inoperative, riding idly over the teeth on the ratchet ring 87. The pull on the film rotates the spindle 90 and the inner portion of the clutch assembly counterclockwise but the outer portion of the clutch assembly is held against rotation by the pawl 110 in engagement with the teeth of ratchet ring 109, thereby serving as a brake on the film. Thus the friction clutch 89—97 functions as a slipping drive in winding around the spindle and, in unwinding, the same friction clutch serves as a brake. By virtue of the one-way clutch 110 the friction clutch 89—97 exerts braking force only in unwinding and not in winding.

It should be understood that the present disclosure is for the purpose of illustration only and that this invention includes all modifications and equivalents which fall within the scope of the appended claim.

I claim:

Winding and unwinding apparatus comprising a spindle having a projecting end to receive a reel detachably, a rotatable sleeve surrounding the other end of the spindle, interengaging friction rings keyed to the spindle and sleeve respectively within the sleeve, a pulley freely rotatable on the spindle intermediate the reel and sleeve with a portion overhanging the sleeve, a one-way clutch interposed between the sleeve and overhanging portion of the pulley for driving the sleeve only in the direction to wind upon said reel, a housing for said spindle, an arm extending from the housing over the pulley into juxtaposition to said sleeve, a ratchet on the sleeve, a pawl on the arm engageable with said ratchet for preventing rotation of said sleeve in the reverse direction to afford braking action while unwinding from the reel, a cap threaded on the end of said sleeve, and a compression spring interposed between said rings and cap.

HAROLD H. KLEMOLA.